United States Patent [19]

Panicucci

[11] Patent Number: 4,475,258

[45] Date of Patent: Oct. 9, 1984

[54] PROCESS AND TOOLING FOR PRODUCTION OF OPEN TOP SHOES WITH RESIN MOULDED BOTTOM, AND SHOES MANUFACTURED IN THAT MANNER

[75] Inventor: Ermanno Panicucci, Pisa, Italy

[73] Assignee: A.P.I. Applicazioni Poliuretaniche Industriali S.p.A., Italy

[21] Appl. No.: 360,672

[22] Filed: Mar. 22, 1982

[30] Foreign Application Priority Data

Apr. 6, 1981 [IT] Italy ............................ 9380 A/81

[51] Int. Cl.³ ..................... A43D 65/00; A43D 65/02
[52] U.S. Cl. ............................ 12/142 RS; 12/142 S; 12/142 T; 264/244
[58] Field of Search ................. 36/11.5, 14, 15, 32 R; 12/142 RS, 142 S, 142 T; 264/244

[56] References Cited

U.S. PATENT DOCUMENTS

| | | | |
|---|---|---|---|
| 3,107,443 | 10/1963 | Binder et al. | 36/14 |
| 3,216,033 | 11/1965 | Nadler | 36/14 |
| 3,755,928 | 9/1973 | Auberry et al. | 36/14 |
| 4,150,455 | 4/1979 | Fukuoka | 36/11.5 |
| 4,347,637 | 9/1982 | Ardito | 12/142 S |
| 4,355,473 | 10/1982 | Ilitzky | 36/11.5 |

FOREIGN PATENT DOCUMENTS

| | | | |
|---|---|---|---|
| 149061 | 3/1937 | Fed. Rep. of Germany | 12/142 RS |
| 1070243 | 7/1954 | France | 36/14 |
| 577034 | 5/1958 | Italy | 36/11.5 |
| 592589 | 9/1947 | United Kingdom | 36/14 |

*Primary Examiner*—Werner H. Schroeder
*Assistant Examiner*—Steven N. Meyers
*Attorney, Agent, or Firm*—McGlew and Tuttle

[57] ABSTRACT

The invention relates to a process and tooling for producing a shoe of open top form having for example two parts of an upper (secured together by means of a buckle or other arrangement) are anchored by pegs within one part of a mould defining the bearing surface for the foot against the bottom of the shoe; the other part of the mould being shaped in such a manner as to define the periphery and the base of the shoe bottom the edges of the mould acting in conjunction to define the upper edge of the bottom of the shoe and to form clefts through which each of the two parts of the upper pass, filling of the mould with mouldable material resulting in the upper components being secured in the bottom of the shoe.

8 Claims, 10 Drawing Figures

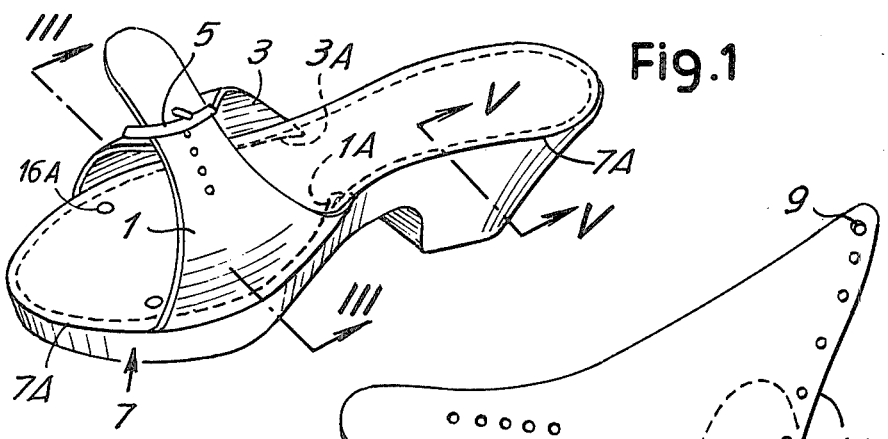
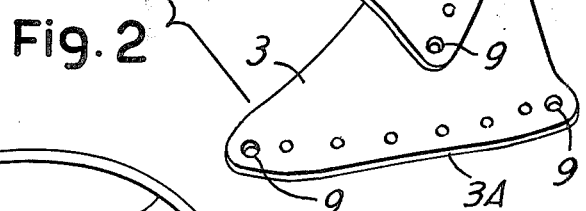
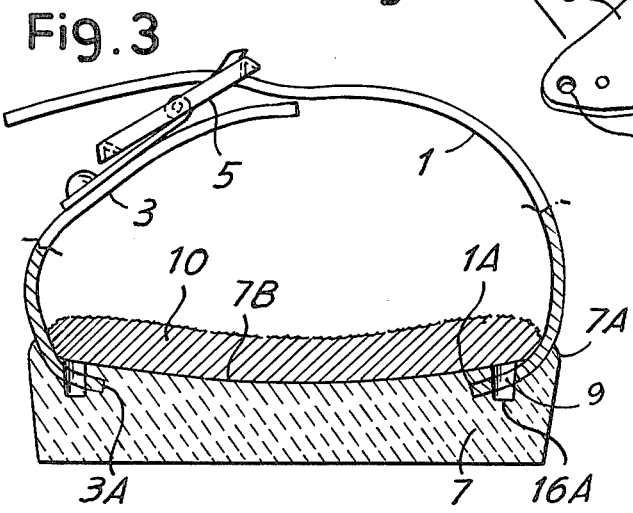
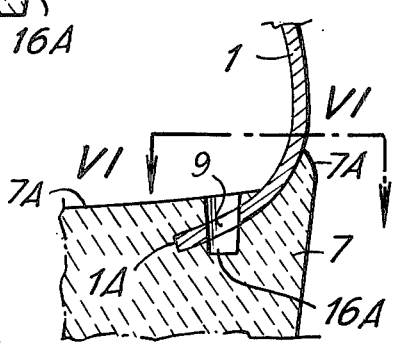
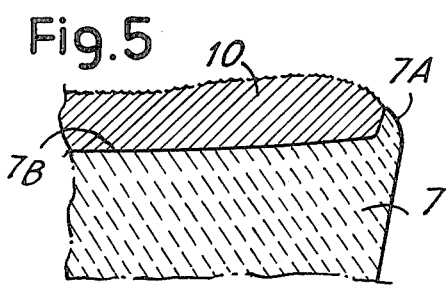

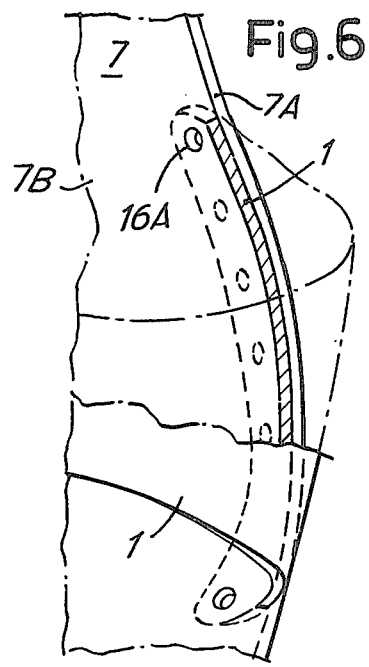
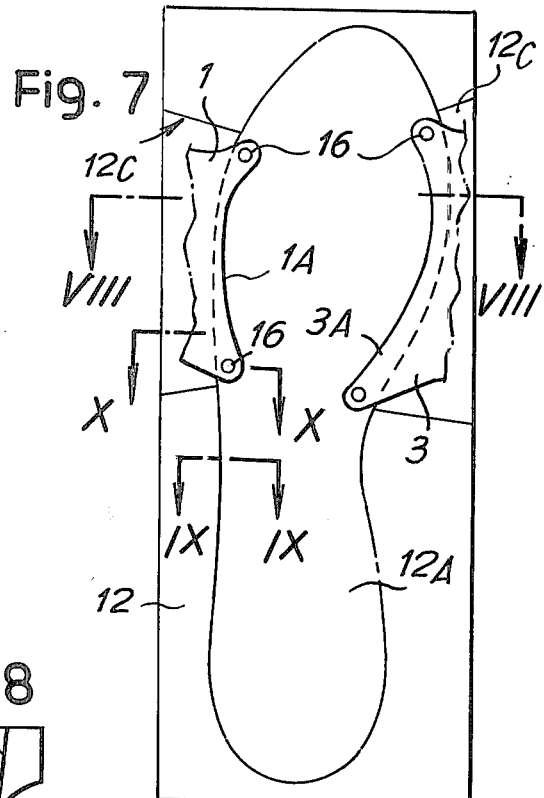
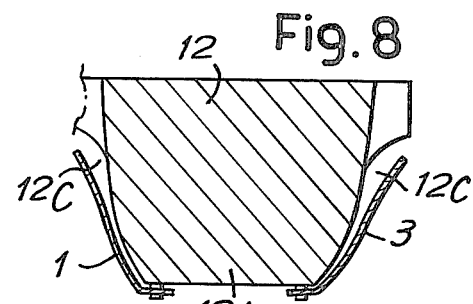
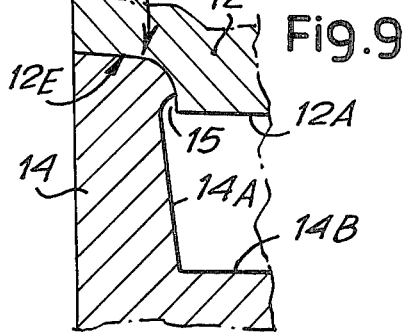
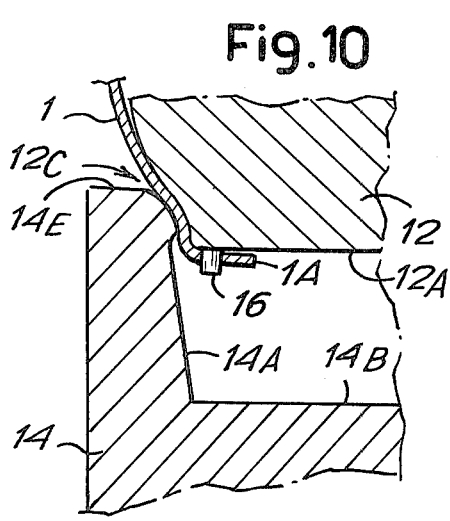

PROCESS AND TOOLING FOR PRODUCTION OF OPEN TOP SHOES WITH RESIN MOULDED BOTTOM, AND SHOES MANUFACTURED IN THAT MANNER

FIELD OF THE INVENTION

This invention relates to a process and the apparatus for producing a shoe with a polyurethane material sole or bottom or of other molded synthetic material, for an open top shoe. The invention relates also to the foot wear thus produced.

SUMMARY OF THE INVENTION

The first object of the invention is to provide a process for the manufacture of an open top shoe in a convenient manner which ensures secure connection between the upper and the shoe bottom, which is molded from polyurethane or similar synthetic material wherein upper component securing edges are secured in a mould defining the shoe bottom, and cleft-like gaps are defined for the shoe upper component or components in the mold.

A further object is to provide tooling in a suitable form for manufacturing a shoe by the process specified above, there being provided a two part mold, which defines the shoe bottom and means for securing the edges of the shoe upper to be incorporated within the bottom.

A still further object is to provide a shoe of open top form of convenient type with a neat and secure upper secured to the sole or bottom.

In practice the process is suitable for open top sandal type shoes, with two independent upper parts which are secured to the pegs of the first part of the mold and extend between the two parts of the mold at the point of the cleft and of similar length limited by the two parts of the mold.

BRIEF DESCRIPTION OF THE DRAWINGS

The invention will now be described by way of example with reference to and as shown in the accompanying drawings in which;

FIG. 1 shows a finished open shoe, constructed in accordance with the invention;

FIG. 2 shows the two components of the upper;

FIG. 3 shows an enlarged schematic transverse section through the shoe, along the line III—III of FIG. 1;

FIG. 4 shows a part of the section in FIG. 3 without sock, that is in the condition existing when the shoe is taken out of the mold;

FIG. 5 shows an enlarged detail section taken along V—V of FIG. 1;

FIG. 6 shows a section taken along VI—VI of FIG. 4;

FIG. 7 shows part of the mold to which the upper components are secured;

FIG. 8 shows a complete section along VIII—VIII of FIG. 7; and

FIGS. 9 and 10 show enlarged sections taken along IX—IX and X—X respectively of FIG. 7 with the two component parts coupled together in the closed mold.

DESCRIPTION OF THE PREFERRED EMBODIMENT

As may be seen from the enclosed drawings in order to produce a shoe in accordance with the invention, upper components 1 and 3 are used to form the bridge of a sandal upper, these being connected by a buckle 5 or similar connecting means. The sole or bottom of the shoe 7 is molded in synthetic thermoplastic polyurethane-type resin. The upper components 1 and 3 have edges 1A and 3A, intended to anchor or be incorporated within the shoe bottom 7.

To construct the shoe, the two edges 1A and 3A have securing holes 9 at least at their ends for the purposes already indicated, in addition to any other eventual securing holes.

To make the moulded bottom 7 and anchor its upper component parts 1 and 3, a two part mold is designed. The first part of the mold 12 is intended to define the upper surface of the shoe bottom 7 in relation to the surface on which the foot comes to bear, the surface being defined by the active surface 12A of the part 12 of the mold. The second part of the mould 14 has an upwardly directed recess and peripheral walls 14A defining the contour of the shoe bottom 7 and a surface 14B defining the lower surface of the shoe bottom 7, i.e. for bearing upon the ground. Opposite the upper component parts 1 and 3, the mold part 12 forms two extensive outer recesses 12C (see FIGS. 8 and 10) whereas in the other areas of part 12 of the mold there is a profile 12E (see FIG. 9) matching a profile 14E of the second part of the mold 14, so as to form a channel 15 (see FIG. 9) within the assembly, intended to form a ridge 7A around the shoe peripheral edge along the upper edge of the shoe bottom 7. Opposite the recesses 12C, the shape of the opposing surfaces of parts 12 and 14 of the mold is such as to ensure the definition of clefts, through which extend the corresponding component parts 1 and 3 of the shoe upper.

Adjacent to the outer recesses 12C a number of pegs or pins 16 are provided, rising from the surface 12A almost perpendicularly to it and to the direction of relative movement between the two parts of the mould. In the example illustrated here, two pegs 16 are provided adjacent each of the recesses 12C. These pegs or pins 16 are hooked into holes 9 in the two component parts 1 and 3 of the upper, the mold part 12 being the upper part of the mould. As the mold is closed, the shoe upper component parts 1 and 3 (see FIGS. 8 and 10) remain trapped between the two parts of the mold in the area of the external recesses 12C (see FIG. 7) and the edges 1A and 3A remain in the recess of the mold intended to define the shoe bottom 7. At that stage the shoe bottom is molded by reaction of the initial raw materials, and the edges 1A, 3A are incorporated within the shoe bottom thus securing the component parts of the upper. The ridge 7A is also formed during the molding process.

The imprints 16A of the pegs 16 shown in FIGS. 1 and 6 thus remain within the shoe bottom produced by the molding process.

In the molding procedure, the shoe upper remains securely anchored and positioned by pegs 16 hooked in position by the appropriate independent component parts.

After molding the shoe bottom 7 and extracting it from the mold, the shoe takes the form shown in FIG. 4, with the upper surface 7B surrounded by the ridge 7A from which the two component parts of the upper extend. Against and upon the surface 7B a sock 10 is bonded, thus covering the prints 16A of the pegs or pins 16 in the mold to which the shoe upper was secured for the molding process, and also covers the part of the edges 1A and 3A incorporated in the shoe bottom 7 and possibly also coming flush or remaining visible. The sock 10 may be padded or in soft material to ensure greater comfort for the feet.

An example in which different shapes and arrangements are used has a component designed for localized injection and reaction.

Various sole and shoe upper configurations may be used.

I claim:

1. A method of manufacturing an open shoe having a plurality of upper components each with a lower edge secured in a bottom of molded synthetic material, each lower edge including at least one hole therein, the method comprising:

providing a first mold part having a first molding surface for forming a foot bearing surface of the shoe bottom, the first mold part having at least one projection for engaging in the hole of each upper components;

hooking each upper component onto one of the projections with the lower edge of each upper components adjacent the first molding surface;

mating the first molding part with a second molding part having a second molding surface for forming a periphery and base of the shoe bottom, to form a closed mold space with the upper component lower edges in the mold space and each upper component held in a cleft-like gap between the first and second mold parts; and molding the shoe bottom whereby the foot bearing surface is formed with an imprint corresponding to each first mold part projection and extending through each hole of the upper components respectively.

2. A method according to claim 1, including providing the first mold part with a pair of spaced projections on either side of the first molding surface, each upper component including a hole in a lower edge thereof on opposite sides of the lower edge, there being a pair of upper components secured to the shoe bottom.

3. A method according to claim 1, including attaching a sock portion over the foot bearing surface and over the plurality of imprints.

4. A method according to claim 1, wherein the projections are provided to extend substantially perpendicularly to the first molding surface.

5. A method according to claim 4, wherein the first and second mold parts are shaped to define a peripheral ridge around the foot bearing surface of the shoe bottom, the cleft-like gap for each upper component formed adjacent the portions of the first and second mold parts for forming the ridge.

6. An apparatus for manufacturing an open shoe having a plurality of upper components each with a lower edge secured to a bottom of molded synthetic material, each lower edge having at least one hole therein, comprising:

a first mold part having a first mold surface for forming a footbearing surface of the shoe bottom;

a plurality of projections extending outwardly of the first molding surface of said first mold part, each projection for engaging a hole of one of the upper components;

an upper component hooked on each projection with a lower edge thereof adjacent the first molding surface of said first mold part;

a second mold part having surfaces for defining a periphery and lower surface of the shoe bottom and for defining a molding space with said first mold part when said first mold part is mated with said second mold part;

said first and second mold parts being shaped to define a plurality of gaps therebetween through which each of said upper components extends respectively with said first and second mold parts mated to form said molding space.

7. An apparatus according to claim 6, wherein the shoe includes a pair of upper components each having a plurality of holes therein, said first mold part having a plurality of projections on each side thereof for engaging said plurality of holes of each upper component respectively.

8. An apparatus according to claim 6, wherein said first and second mold parts are shaped to form a peripheral ridge on the shoe bottom around the foot-bearing surface thereof.

* * * * *